US012318820B2

(12) United States Patent
Mallipeddi

(10) Patent No.: US 12,318,820 B2
(45) Date of Patent: Jun. 3, 2025

(54) CLEANING APPARATUS AND ASSOCIATED METHOD OF USE

(71) Applicant: Millan Mallipeddi, Bartlett, IL (US)

(72) Inventor: Millan Mallipeddi, Bartlett, IL (US)

( * ) Notice: Subject to any disclaimer, the term of this patent is extended or adjusted under 35 U.S.C. 154(b) by 553 days.

(21) Appl. No.: 17/716,164

(22) Filed: Apr. 8, 2022

(65) Prior Publication Data

US 2023/0321697 A1 Oct. 12, 2023

(51) Int. Cl.
*B08B 3/10* (2006.01)
*B08B 3/12* (2006.01)
*E03C 1/04* (2006.01)
*E03C 1/05* (2006.01)

(52) U.S. Cl.
CPC ................ *B08B 3/102* (2013.01); *B08B 3/12* (2013.01); *E03C 1/0404* (2013.01); *E03C 1/055* (2013.01); *E03C 2201/40* (2013.01)

(58) Field of Classification Search
CPC ...................................................... B08B 3/102
See application file for complete search history.

(56) References Cited

U.S. PATENT DOCUMENTS 6,624,133 B1 9/2003 McKenzie et al.
7,950,254 B2 5/2011 Gray et al.
2005/0120756 A1 6/2005 Mah
2012/0227761 A1 9/2012 Leighton et al.
2021/0094081 A1 4/2021 Birkin et al.

FOREIGN PATENT DOCUMENTS

| | | | |
|---|---|---|---|
| CN | 201299474 | Y | 9/2009 |
| CN | 202466721 | U | 10/2012 |
| CN | 108852223 | A | 11/2018 |
| CN | 208625492 | U | 3/2019 |
| CN | 111321782 | A | 6/2020 |
| EP | 595783 | A3 | 10/1995 |
| EP | 1598469 | A1 | 11/2005 |
| JP | H07-012063 | A | 1/1995 |
| JP | 6558049 | B2 | 8/2019 |
| KR | 200320355 | Y1 | 7/2003 |
| KR | 101167113 | B1 | 7/2012 |
| KR | 102231932 | B1 | 3/2021 |

OTHER PUBLICATIONS

Sonic Soak—Ultrasonic Cleaning Tool; retrieved from the internet site <https://sonicsoak.com/products/sonic-soak> on May 25, 2022, 20 pgs.

*Primary Examiner* — Jason Y Ko
(74) *Attorney, Agent, or Firm* — Thompson Coburn LLP; Thaddeus J. Blenke

(57) ABSTRACT

A cleaning apparatus for use with a water source, the cleaning apparatus including a handheld cleaning device that includes a transducer therein that is capable of stimulating water located inside a body of the handheld cleaning device, such that bubbles created by the excitation of the water via the transducer can be used to provide a cleaning effect, for example to clean the surface of a soiled object by way of bubbles bursting at, on or near the surface of the object.

20 Claims, 9 Drawing Sheets

CLEANING APPARATUS AND ASSOCIATED METHOD OF USE

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND

Countries such as the United States of America use a tremendous amount of soap/detergent (collectively "soaps") products for cleaning purposes. These soaps may end up in waterways, contributing to pollution. Moreover, the (e.g., plastic) packaging used for soap products also contributes to global pollution. What is needed is a way to achieve sufficient cleaning of objects without the need for soap products.

SUMMARY OF THE INVENTION

This section provides a general summary of the disclosure, and is not a comprehensive disclosure of its full scope or all of its features.

The present application relates to an apparatus and method for cleaning that uses cleaning techniques that achieve soap-less cleaning. In doing so, the above-noted pollution problems, etc. attributed to soap products may be reduced.

One embodiment relates to a cleaning device that attaches to a liquid source such as a water faucet.

Another embodiment relates to a liquid source, such as a water faucet, where the cleaning device is integral, e.g., built-in, to the water faucet.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF THE DRAWINGS

The accompanying drawings, which are incorporated in and form a part of the specification, illustrate the embodiments of the present disclosure and together with the description, serve to explain the principles of the disclosure.

Figure 1:
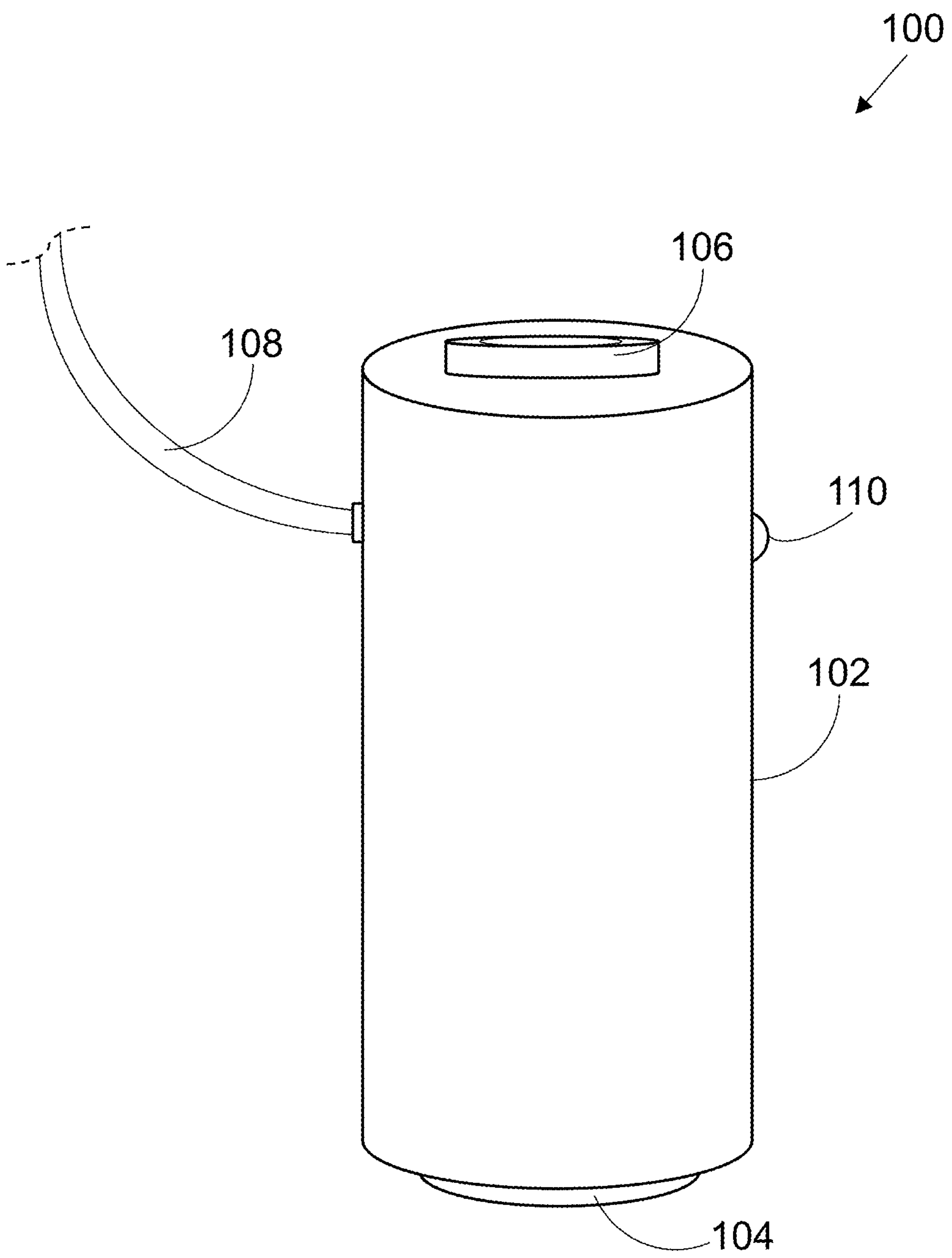
FIG. 1 illustrates an embodiment of a cleaning apparatus.

Reference characters in the written specification indicate corresponding items shown throughout the drawing figures.

DETAILED DESCRIPTION

Referring to FIG. 1, one embodiment of a cleaning apparatus 100 is shown. The apparatus 100 may be configured as a handheld device, allowing for a user to grip the device and manipulate it as desired during cleaning of an object. The apparatus may comprise a body 102 having a generally cylindrical shape, having one end 104 as an active (e.g., cleaning) end (although the body can be shaped otherwise, e.g., square, rectangular, etc.). The wall(s) of the body define an internal volume of the body. Although not shown in the figures, the body 102 may have contours/indents and/or other gripping features formed in/on the outer surface of the body 102 (e.g., texturized patterns or other raised elements) to allow for improved grip of the body 102 by a user. The contours/indents may be configured, for example, to be recessed relative to the outer surface of the body and shaped in a manner that approximates average-sized fingers and that accommodates fingers of a user when the user grips the body, for improved gripping during use of the apparatus. Portions of the outer surface of the body and/or the gripping features may comprise rubber (or similar) material to provide improved gripping, especially in view of the wet operational environment that device 100 is intended to be used in. In operation, a user using the powered apparatus passes the active end 104 of the apparatus over a surface of an object to be cleaned (or passes the object to be cleaned under active end 104) in order to clean the surface of the object via excited liquid exiting from end 104 (e.g., water including bubbles, such bubbles being induced to form in the water by way of an energy source that stimulates the water such that cavitation occurs). Active end 104 may be referred to as a cleaning end or second end. The excited liquid is output/emitted from the active end 104 of the device 100, and interacts with the object to be cleaned (e.g., as the object is passed under end 104 of the handheld unit 100). The other (e.g., opposite, aka non-cleaning) end of the apparatus 100 may comprise an attachment interface/member/coupling 106. This other end may be referred to as a first end or a non-active end. Cord 108 provides power and/or other (e.g., control/driving) signals to the electronics contained within the handheld unit, and power/function button 110 provides on/off functions for the handheld unit 100 (e.g., to turn on/off the cleaning function). For example, the cord 108 may comprise one or more wires for providing power and/or other control signals to components in body 102, and the cord/wires may be referred to as conductors (conduits) and/or signal carriers/signal carrying conductors (conduits).

Figure 2:
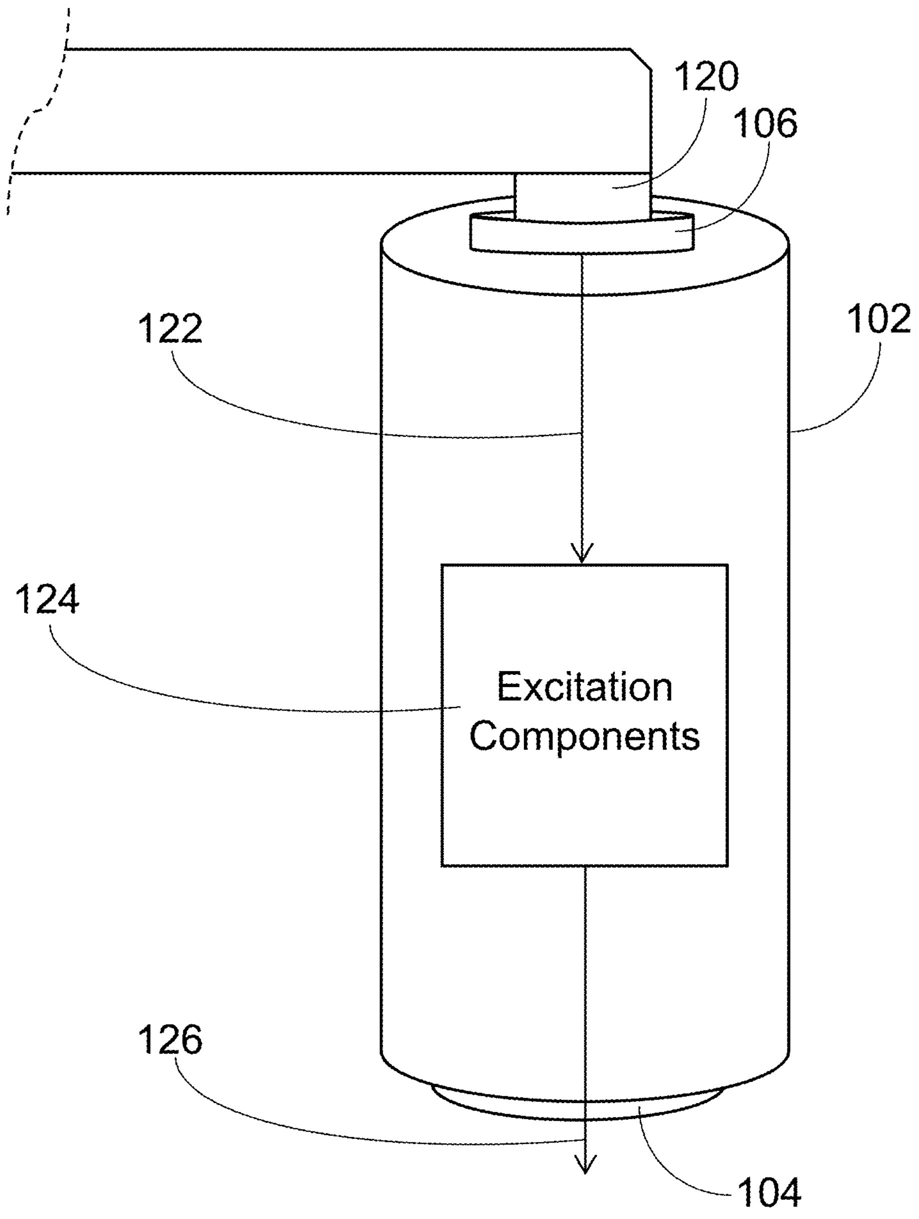
FIG. 2 illustrates the apparatus of FIG. 1 attached to a water source.

With reference to FIG. 2, this figure represents a flow schematic for how water enters body 102, is excited within body 102, and exits the body 102 for use in cleaning. The attachment member 106 is for attachment to a liquid (water) source such as a water faucet/spout (e.g., of a kitchen sink), for example, and for connection to a body portion of the faucet/spout, such as a tip/end 120 of the faucet/spout ("spout", "faucet", and "faucet head" may be used interchangeably herein to indicate the water source). The attachment member 106 may comprise threads for operatively attaching/mating to threads of the faucet tip (such as at the aerator), and/or may comprise a pliant material such as rubber (or similar) material that can fit over the tip of the faucet. For example, attachment member 106 may be configured as a rubber grommet with a hole in the middle that is sized to be fit/sealed around the tip 120 of the spout to provide a water-tight/leak-proof interface between the device and the spout, enabling the passage of input water 122 from the spout into the body 102. The attachment member 106 may comprise a set of grommets, that, for example, are sized to be compliant with various spout profiles, so that a user can select the best fitting attachment member for their particular spout. The attachment member 106 serves the purpose of connecting the non-cleaning end comprising 106 of the body 102 to a water source in a water-tight/leak-proof manner so as to allow for the flow of water through the cavity of the body 102 when connected with the spout, without undesired leaks, so that the water inside the body 102 can be stimulated by the mechanical energy from excitation components 124 contained in the body 112. The attachment member 106 may comprise additional elements (not shown) such as various O-rings or other sealing members to achieve a water-tight/leak-proof connection between the faucet and the device 100. More generally, the connection between the device 100 and a water source may comprise structures that serve to create a fluid communication connection interface for connection of the device 100 with the water source in order to provide for a water-tight/leak-proof connection interface. The water excited by components 124 then exits the body 102 at an outlet at end 104 as exiting/excited water 126, which, when flowed on/over a surface of an object (e.g., utensils, dinnerware, etc.) placed adjacent the active end 104, cleans the surface of the object by way of the bubbles present in the water 126, where the bubbles burst to remove food particles and such from the surface of the object. The bursting causes a (micro) jet emission, with force sufficient to dislodge particles from a surface of an object. When these (micro) jets occur in the millions due to millions of bursting bubbles, a sufficient cleaning effect can be realized.

Referring back to FIG. 1, the power button 110 allows for the cleaning effect provided by the device 100 to be turned on/off as desired. This, for example, allows for the device 100 to effectively stay permanently mounted to the spout, and to only be used when a user so desires (e.g., this means that device 100 does not need to be constantly attached/disconnected from the faucet). For example, in an unpowered state, the device 100 simply allows for water from tip 120 to flow through body 102 without being excited, whereas in the powered state, the water passing through body 102 is excited by the excitation components 124 located in the body 102.

In a preferred (but non-limiting) embodiment, excitation components 124 comprise, for example, at least one ultrasonic transducer, contained within a housing inside of body 102. More specifically, the components 124 may comprise an ultrasonic transducer that, when energized and emits sound waves, excites the water that fills body 102 so that bubbles are created in the water, such bubbles having a cleaning effect when they burst on a surface over which the water runs. This may be referred to as ultrasonic cleaning. Ultrasonic cleaning uses sound waves of a certain frequency transmitted through liquid to generate (e.g., micro) bubbles which act as microscopic scrubbers, capable of cleaning a dirty surface of an object. Cavitation bubbles form when sonic energy creates a void (or cavity) which gets trapped as a bubble in a liquid. These bubbles burst with enough force capable of clearing surface particles adhered to a surface of an object, such as a dirty plate. Cavitation may be referred to as a surface interaction between the excited liquid and the object (e.g., the surface of the object). While one bursting bubble may not provide sufficient cleaning force, large amounts (e.g., millions) of bubbles bursting in similar timeframes as one another can have the effect of dislodging dirt or other particles from a surface of an object, thereby cleaning the surface. For example, in one application, food particles and/or leftover food substances can be cleared away from the surface of a food plate. Depending on the type of transducer(s) used as part of components 124, ultrasonic sound waves with a frequency of –25 to 50 kHz agitate/excite the liquid, thereby generating bubbles in large quantities. This frequency range is one example of a viable transducer frequency, and is not limiting—the entire range of ultrasonic frequencies is envisioned, so long as any particular ultrasonic frequency is viable for cleaning applications and does not otherwise produce adverse interference or other issues (complications with animals/pets capable of hearing ultrasonic frequencies). Such ultrasonic cleaning techniques can also be used to clear a variety of other substances/materials such as dust, dirt, oil, grease, etc. from the surface of an object. Any undesired material on the surface may be referred to as a (surface) contaminant.

Referring back to FIG. 2, the attachment member 106 of the apparatus is operatively attached, in fluid communication, with tip 120 of the faucet (e.g., spout). The excitation components 124 and a housing therefore are all located within body 102 for excitation of liquid stored in and/or passing through the body 102, via transfer of the mechanical (e.g., vibrational) energy generated by the component(s) 124 to the water. Thus, the apparatus, when used in conjunction with a liquid source (e.g., water from a (kitchen) sink faucet), provides a cleaning effect, such as for the cleaning of dirty dishes. As described above, the cleaning effect may be realized by way of at least one ultrasonic transducer as part of components 124 that stimulates the water for creation of bubbles that provide a cleaning effect when the bubbles interact with a surface of an object. The fluid connection allows for input water 122 from the faucet to be input into the body 102 of the apparatus. The excitation components 124 inside of the body function to stimulate the input water 122 to produce output water 126. Output water 126 is water that includes bubbles introduced by the excitation from the excitation components 124. The output water 126 exits from active end 104, so that the user, passing the active end 104 over a surface of an object to be cleaned, can clean the surface of the object to be cleaned via the output water 126 exiting from active end 104. Using hot water (e.g., 120 to 140 degrees F., as is common with water heater temperature settings) may be preferred, as the higher heat may help to loosen dirt and/or break bonds faster, improving the cleaning effect. FIG. 2 does not show all features of the device from FIG. 1, such as cord 108 and button 110.

In one embodiment, the cleaning device 100 uses AC (e.g., wall) power, and a (e.g., generator) circuit that drives or otherwise provides control signals for the components 124. In the context of ultrasonic transducers, the generator circuit may comprise an ultrasonic generator (aka (ultrasonic) driver/control circuit) to transform the AC (source) power to a state/level usable for driving the transducer, which converts the electrical energy to mechanical (e.g., vibrational) energy. Power cord/wire 108 is connected to the AC power source. The electronic ultrasonic generator may be referred to as a power supply that transforms AC electrical energy from a power source such as a wall outlet, to conditioned electrical energy necessary for energizing a transducer at the rated frequency of the transducer. For example, the ultrasonic generator transmits (e.g., high-voltage) electrical signals (e.g., pulses) to the transducer, which then transforms the signals (e.g., pulses) into mechanical (e.g., pressure) waves, creating vibrations that can be utilized to provide a cleaning function by way of bubbles generated from the vibrations. Ultrasonic transducers typically produce sounds at 20 kHz or greater (e.g., outside of the hearing range of humans)—these ultrasonic vibrations stimulate water to create bubbles that can be utilized for (e.g., surface) cleaning. An ultrasonic generator within the context of the present disclosure may comprise circuitry such as (e.g., MOSFET) transistors and other high-quality electrical/electronic components such as rectifiers (diodes) and other amplifiers or ICs, all designed for prolonged use. The generator may comprise a square-wave ultrasonic generator that generates a harmonic output at several frequencies, with such multi-frequency contributing to consistent, evenly distributed vibrations, which may increase any cleaning effective. Generators using a sine-wave pattern are also envisioned. For example, a sine-wave generator may create ultrasonic cavitation bubbles in evenly-spaced lines, which may result in so-called dead spots between the spaced lines, which may result in uneven cleaning performance. But sine-wave generators can include a "sweep" function to sweep the frequency to reduce dead spots and any detrimental performance resulting from such dead spots. The ultrasonic generator can be self-tuning, capable of sensing the load of components, and adjusting power output based on the sensed load. Thus, the choice of which type of generator to use may be based on various design considerations.

In the ultrasonic embodiments above, the specifications of the ultrasonic transducer can be selected as desired. For example, a 60 W, 50 kHz ultrasonic transducer may be used. But any suitable power rating and/or frequency rating can be selected to arrive at desired vibrational/bubble-formation characteristics. Low frequencies may yield bigger, stronger and/or more aggressive cleaning bubbles than higher frequencies, but may produce fewer bubbles per second. Conversely, higher frequencies may yield more bubbles per second, but the bubbles may not be as big and/or strong and/or aggressive as compared to lower frequencies. For example, a 200 kHz transducer may generate smaller bubbles that are better suited at cleaning delicate items than a transducer with a frequency of 30 kHz. Thus, the range of frequency options may span from 20 to 200 kHz, for example. The power rating of the excitation component (e.g., transducer) may also be selected as desired, for example based on considerations such as cleaning power, power consumption, (electricity) operating costs of the device, etc.

Figure 3A:
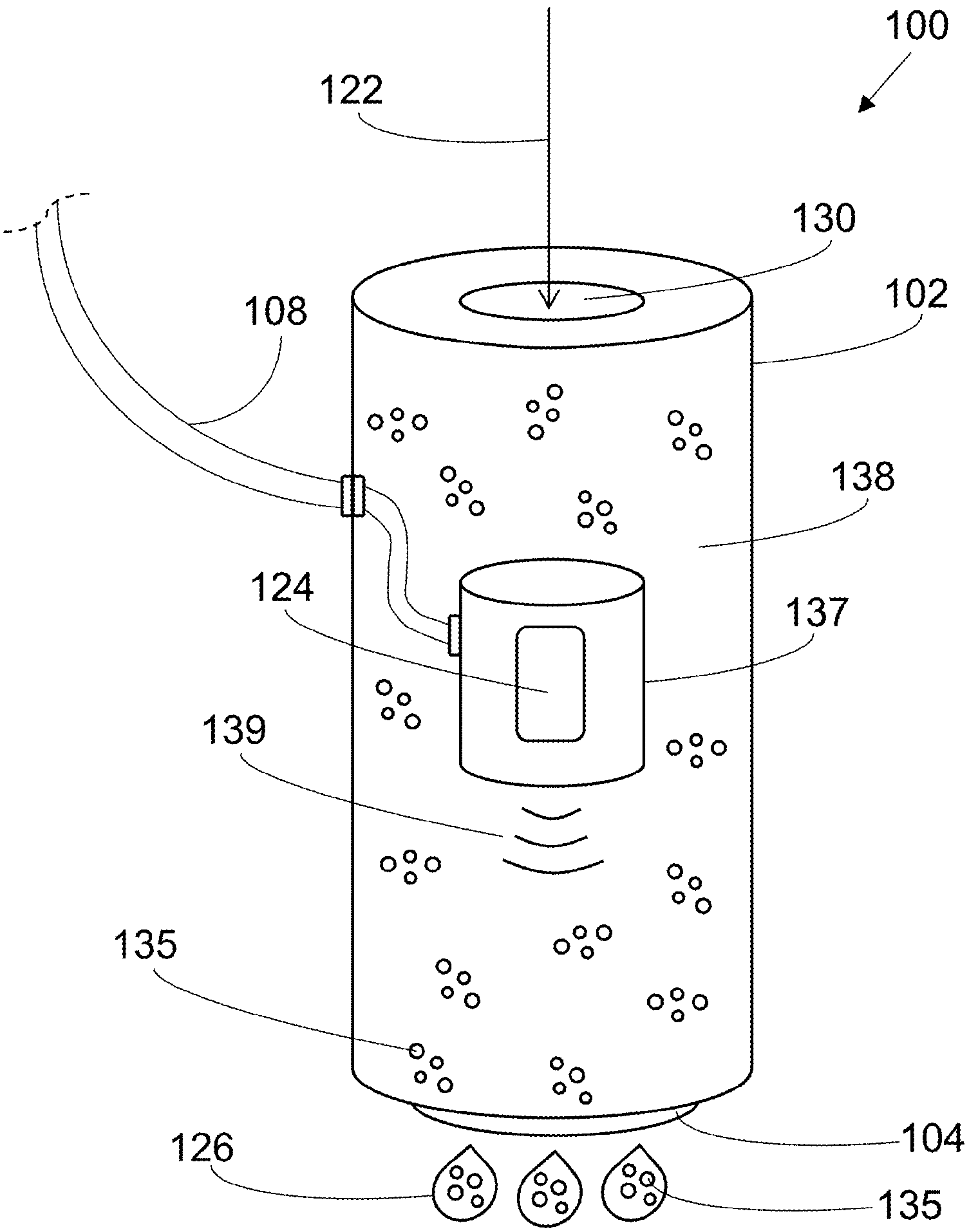
FIG. 3A illustrates an embodiment of an internal configuration of the apparatus of FIG. 1.

FIG. 3A illustrates a generalized embodiment of an internal configuration for the device 100. In operation, the input water 122 (see also FIG. 2) flows from the faucet through coupling 106 (see FIGS. 1 and 2) and inlet 130, which allows for entry of input water 122 from the faucet into body 102. Inlet 130 may comprise a hole/opening in a top/upper portion of body 102. Cord 108 may pass through an opening (not shown) in a (side) portion of body 102, and a grommet/gasket or other sealing member/mechanism/device may be used at such entry hole/interface into body 102 for purposes of creating a water-tight seal/interface for cord entry. The cord 108 carries the necessary wire/wires therein for driving/controlling the components 124. Components 124 may be housed in housing 137, and, when components 124 are energized/driven, they produce mechanical (e.g., vibrational) energy that stimulates the water inside of internal volume 138 of body 102, so that cavitation occurs and bubbles are generated in the water inside of volume 138. The internal volume 138 may be referred to as a reservoir. The excitation components 124 may also cause housing 137 itself to vibrate and likewise stimulate the surrounding water inside volume 138. Housing 137 may be sized/shaped in a variety of a manners, made of any desired material (e.g., one that aids in energy propagation) and also may be secured/fixed within volume 138 or configured in a floating arrangement inside volume 138. For example, housing 137 may only be tethered to cord 108, and may float/rise/fall relative to the water level/amount in reservoir 138. In a floating arrangement, the portion of cord 108 inside of body 102 may be sized with a length capable of providing for the desired extent of flotation and/or movement of housing 137 during flotation. The housing 137 may be sized in a manner where the height and/or width closely match interior dimensions of volume 138, such that the housing 137 has little to no wiggle room inside of volume 138, but still allows for water build-up and passage inside of volume 138. Alternatively, housing 137 can be fixed/secured to an internal portion of body 102 via various securing mechanisms (not shown), such as brackets, fasteners, or other coupling configurations that secure the housing 137 in internal surfaces/structures of volume 138. Moreover, while cord 108 is shown in FIG. 3A as being submerged in the water inside 102, it may instead be isolated from the water by a water-tight (aka dry) compartment configured for passage of cord 108 therethrough, so that cord 108 is never directly exposed to any water. Examples of such compartments are described below in connection with other embodiments. In the case where cord 108 is configured for exposure to water, it may have a sheathing or other protection to ensure that no complications relative to being submerged in water are experienced. The water in reservoir 138 gets excited by (mechanical) energy 139 so that bubbles 135 are created, and excited water 126 containing bubbles 135 passes through an outlet of active end 104 (bubbles 135 in the figures are shown in an enlarged/exaggerated state for visibility purposes—their actual size is determined, for example, on the properties of the water and/or the excitation energy/frequency that caused the bubble formation, and the bubbles may comprise diameters in the micron-range). When the outlet water 126 flows on a surface of an object to be cleaned, the bubbles 135 burst on/at/near the surface and blast away any particles in proximity of the burst radius.

Figure 3B:
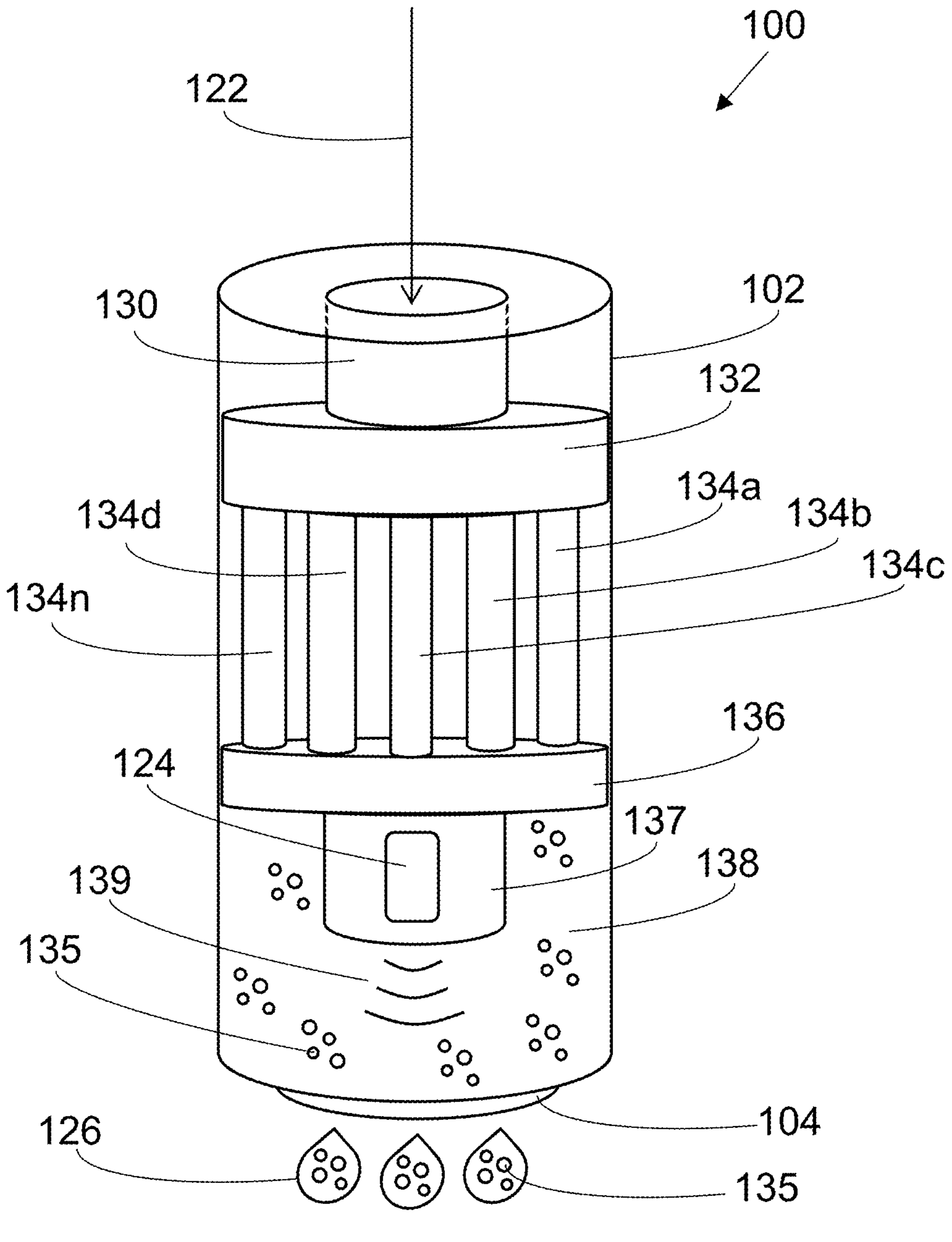
FIG. 3B illustrates an alternative embodiment of an internal configuration of the apparatus of FIG. 1.

FIG. 3B illustrates an alternative embodiment of an internal configuration for the device 100 that provides more expansive/detailed control over the flow of water inside the body 102 (e.g., in comparison to the base embodiment in FIG. 3A). The internal configuration shown in FIG. 3B has structures that route the incoming water and provides, for example, for delay with respect to the water flow and filling of the internal volume of the body. In operation, the input water 122 may pass from the faucet and attachment member 106 (see FIGS. 1 and 2) through to inlet 130, which allows for entry of input water 122 from the faucet into body 102. In this embodiment, inlet 130 may comprise a more defined inlet member structure, such as a tube, pipe, coupling or other channel or pass-through for transmission/flow of liquid/water. In this embodiment, the internal volume of the body 102 may comprise various structures that serve to guide/restrict and/or otherwise control liquid flow and/or holding of water within the body 102. Inlet member 130 is operatively attached and in fluid communication with a first liquid (e.g., water) distribution plate 132. The top side of the distribution plate 132 closest to inlet member 130 may comprise an opening sized to match the diameter size of the inlet member 130, so that the water exiting from inlet member 130 passes through to distribution plate 132 (alternatively a plurality of apertures approximating the diameter of the outlet of plate 132 may be formed in the top surface of plate 132). Thus, the fluid interface between inlet member 130 and distribution plate 132 may be a singular opening, or a plurality of smaller openings, for example to provide aeration or other manipulation of the water exiting from the end of inlet member 130 into distribution plate 132. The distribution plate 132 may comprise a hollow interior/reservoir/volume, and a plurality of exit holes in its other (e.g., bottom) side (e.g., the side opposite the top side of plate 132 closest to inlet member 130). The water from inlet member 130 accumulates in the interior volume of distribution plate 132, and ultimately passes through the exit holes of the distribution plate 132. The exit holes of plate 132 are in operative fluid communication with a plurality of tubes 134*a*, 134*b*, 134*c*, 134*d* . . . 134*n* (e.g., where "n" represents any final tube of the total amount of tubes). The water that exits from tubes 134*a* . . . 134*n* is input to corresponding input holes formed in a top side of a second liquid (e.g., water) distribution plate 136. The input holes of plate 136 correspond to ends of tubes 134. Thus, one end of each tube 134*a* . . . 134*n* is in operative fluid communication with first distribution plate 132, and another (opposite) end of each tube 134*a* . . . 134*n* is in fluid communication with second distribution plate 136. The tubes 134*a* . . . 134*n* may be arranged in a circular manner around each of plates 132 and 136, but this is not limiting as any desired arrangement is envisioned (e.g., the shape of the body 102 could instead be generally rectangular, and the plates could likewise be generally rectangular, with the tubes grouped/configured in any desired pattern). The second distribution plate 136 may comprise a hollow interior/reservoir/volume capable of holding water. The bottom side of plate 136 is configured (e.g., with one or more holes/apertures) to allow for exit of water from the interior of plate 136 through the bottom side of plate 136, to fill reservoir 138. These (e.g., routing) structures (e.g., plates, tubes, holes) serve the purpose of introducing latency time, so that the water inside the reservoir of the body may have a delayed fill/storage time for purposes of increasing exposure time of the water to the energy from the excitation components, which may be useful in optimizing bubble formation. The plates 132/136 may be fixed/secured to the surfaces of inside volume 138 by way of adhesive, mechanical fasteners/fixtures, and/or other arrangements such as welding and the like, and also may include sealing implements such as O-rings, gaskets, etc. And similarly for the tubes relative to the plates. For example, although not shown, the inside surface of volume 138 may comprise an indent, and the outside surface of the plates may comprise a matching indent. An O-ring or other sealing implement sized to match the indents may be located in between the matching indents so that a tight seal is present between the inner wall of volume 138 and plate 132/136, while also providing for fixing of the plate(s) in the desired location. Other techniques may be used to fix plates, tubes, etc. in a permanent manner inside volume 138. For example, the plates/tubes etc. can be (e.g., ultrasonically) welded. The combination of the plates 132/136 and tubes 134*a* . . . 134*n* (and any related parts/components thereof) may be referred to as a liquid distribution arrangement. Housing 137 houses the components 124, and the combination of the housing 137 and components 124 may contribute to the overall excitation of the water in reservoir 138. The housing 137 may protrude from the bottom of plate 136 into the reservoir 138, such that water inside the reservoir 138 is excited by the excitation components 124 and/or housing 137. Multiple sets of structures 132/134/136 may be used, or reduced amounts (e.g., only one plate, and one (or more) tubes). As discussed above, the excitation components may comprise at least one ultrasonic transducer driven by driving circuitry, and vibrations from the driven transducer may be propagated (e.g., via housing 137) as mechanical energy 139, and transferred to the water to stimulate the water. The water in reservoir 138 gets excited by the energy 139 so that bubbles 135 are created, and excited water 126 containing bubbles 135 passes through an outlet of active end 104 to be used for cleaning. The housing 137 may be secured/fixed to the plate 136 in similar manners as described above. Moreover, usage of other materials such as grease corresponding to any O-rings is also contemplated herein. For example, the internal configuration of FIG. 3B is conceptually similar to that of a swimming pool that has a "finger" filter. The tubes 134*a* to 134*n* may also provide a filtering effect. The plates 132/136 may have any variety of internal chambers/compartments that route water in a desired manner, and/or dedicate some compartments/chambers as sealed passages for wire pass-through, so as to isolate any wires passing though the plates from any water. For example, from the point of entry of any wires from cord 108 or cord 108 itself into the interior of body 102, there may be a complete dry path for passage of the wires, so that the wires inside of body 102 are never directly exposed to water, despite being located inside of volume 138. The uses of tubes and plates in connection with the embodiment of FIG. 3B is merely one example and is not limiting. Other water routing/controlling techniques may be used, and other wire routing schemes may be used. Additionally, other features such as air introduction passages/ducts, etc. may be used, for example, to introduce air for further stimulating bubble production. Thus, various water routing designs can be used so long as there is the necessary protection of the electrical/electronic elements from the water, and so long as there is a suitable portion (e.g., reservoir) for excitation of water to introduce the cleaning bubbles. While plates 132/136 are referred to as plates, they generally comprise a structure with an enclosed volume with fluid entry/outlet ports for fluid flow into/out of the volume, where the internal volume has various routing structures/chambers/compartments, etc., to allow for control and passage of fluid in a desired manner. Some compartments may be dry compartments intended to be kept dry/separate from any fluid, and others may be wet compartments that may comprise compartments for fluid flow, including various fluid interconnectedness between such compartments.

Figure 4:
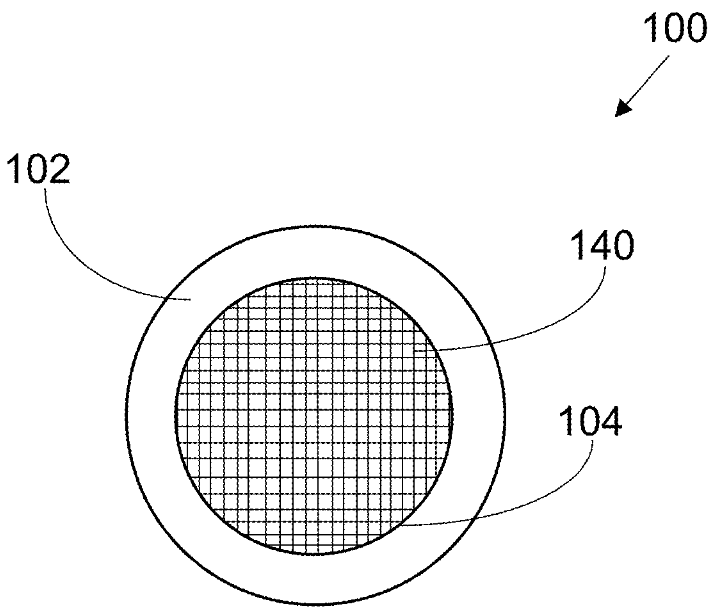
FIG. 4 illustrates a bottom view of the apparatus of FIG. 1.

FIG. 4 shows outlet 140 at end 104 of body 102, and that the outlet may comprise an aerator-type configuration for the exiting excited water to pass through (although this configuration is merely an example and not limiting). Any screen/filter at outlet 140 may be configured to optimize and/or assist with excited water distribution, and as such the pattern at 140 shown in FIG. 4 is not limiting. Additionally, the cleaning end 104 with the outlet 140 may comprise a closing valve or other closing mechanism (not shown) located at/near the cleaning end, which when closed prevents excited water from exiting the outlet (and when open allows excited water to exit from the outlet). This may serve a similar purpose as described herein with respect to introducing additional time delay and/or exposure time of the liquid in the reservoir to the stimulating energy of the excitation components, so as to further induce additional bubble formation. With reference back to FIG. 3, at active end 104, the excited water 126 with bubbles 135 exits, so that a surface of an object to be cleaned, when passed under end 104, is cleaned by the bubbles 135 when the water 126 flows over the surface such that bubbles 135 burst on/at or near the surface to be cleaned. The outlet 140 of active end 104 may be configured with a fine screen to provide aeration. When a user passes a surface of an object to be cleaned under active end 104, the excited water 126 cleans the surface of the object.

Figure 5A:
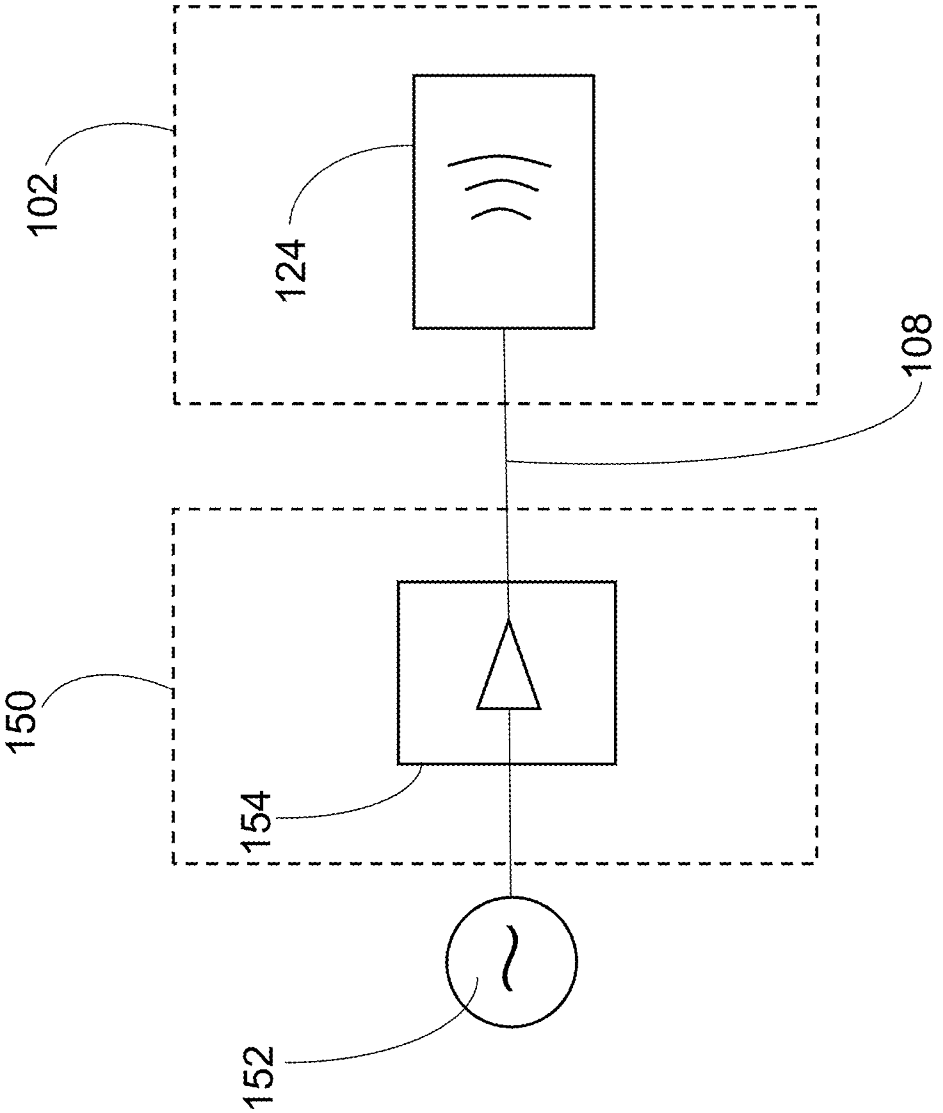
FIG. 5A illustrates a schematic according to the embodiment in FIG. 1.

FIG. 5A illustrates a schematic according to certain embodiments above. A power adapter 150 is provided to power the device 100 (e.g., using AC wall power 152 (e.g., 120 V and 60 Hz for the U.S., other territories may differ)), for powering a driver/control circuit 154. The adapter 150 may comprise its own housing outside of/separate from the device 100. In certain embodiments, circuit 154 may be a transducer driver circuit 154 that drives the (e.g., transducer) components 124 (e.g., circuit 154 may be all of a part of the generator circuit discussed herein). The powering/driving of device 100 can be achieved by way of power cord 108 extending from the adapter 150 to the body 102 of device 100. The driver circuit 154 is configured to transform the AC power 152 for driving the transducer 124, and may comprise various circuit elements including diodes (rectifiers), transistors, other amplifiers, IC chips, etc., to provide the transducer with the proper driving signal (e.g., comprising any necessary AC to DC conversion, signal conditioning, etc.). The power adapter 150 may comprise a housing (not shown), and the driver circuit 154 may be located in the housing. The driving signals from circuit 154 may be output via power cord 108 to the components 124 located inside body 102 of device 100. For example, the wires of cord 108 may ultimately terminate with direct connection to excitation components 124. The cleaning device may comprise a kit with a faucet system. The kit can include a device 100 along with a faucet to which device 100 connects to.

With reference back to FIG. 3B, the wires from power cord 108 (see FIG. 1) may, for example, be passed (i) through a sidewall portion of the body 102 into a compartment (not shown) of distribution plate 132, (ii) through a dedicated (dry) tube from amongst tubes 134*a* to 134*n*, (iii) through a compartment in distribution plate 136, and (iv) ultimately to housing 137 that houses the transducer 124. All of the compartments may be interconnected in a sealed manner to ensure no water is present in any of the compartments, thereby creating a complete dry path from the entry point of cord 108 in body 102 to its terminating point at attachment to housing 137/components 124. Within housing 137, the wires may be physically connected (e.g., soldered, via lugs, etc.) to leads of the transducer of components 124 located within housing 137 so that the driving signal may be provided to the transducer (wires may alternatively or in addition be attached to a circuit board inside of 137, and traces/lands on the circuit board may route signals as needed). The compartment in each distribution plate may comprise an isolated (e.g., sealed) compartment, kept dry from the remaining internal volume of the distribution plate that stores water. By way of such an arrangement, an interconnected, dry network of compartments, tubes and/or other portions create a wire path that accommodate a wire run were the wire is not exposed to any water from other parts of device 100. The wires from cord 108 may pass into the body 102 and through the compartments (of the distribution plates) and corresponding tube (e.g., 134*n*), etc., such that the wires are never directly exposed to water. For example, the compartment in plate 136 may be sealingly connected to housing 137. Regardless, the wires should preferably be coated and/or otherwise sealed to provide for safe usage in such a water-based environment that device 100 is used in. The housing 137 and/or body 102 may be made of materials to optimize the transfer of mechanical/vibration energy from the transducer. For example, any material that optimizes the excitation of water in reservoir 138 by transducer 124 is envisioned, including any metal, plastic, or other materials. Moreover, the above-described wire arrangement may be configured in another manner (i.e., the above-described wire arrangement embodiment is not limiting and only one example of how the wires can be run). All of the above-mentioned parts may be sealed as needed to ensure a water-tight/leak-proof system. For example, the various interface connections between parts including but not limited to attachment member 106, inlet member 130, plates 132 and 136, and tubes 134*a* to 134*n*, and housing 137, including any interlinked compartments thereof, may comprise interface connections that have sealing members (e.g., O-rings, etc.) to ensure a water-tight/leak-proof system.

In a preferred embodiment, the excitation components (e.g., 124) comprise a transducer and any related circuitry (e.g., transistors, etc.) necessary for optimal operation of such transducer. Various (ultrasonic) transducers can be used, including, but not limited to, piezoelectric (e.g., crystal) transducers. For example, a piezoelectric crystal converts electrical energy to ultrasonic energy through the piezoelectric effect, in which the crystals change size and shape when they receive electrical energy. A piezoelectric ultrasonic transducer may include a backing, which is a thick material that absorbs the energy that radiates from the back of the piezoelectric crystal, as well as a radiating plate, which works as a diaphragm that converts the ultrasonic energy to mechanical (pressure) waves in the fluid. Thus when the piezoelectric crystal of the transducer receives pulses of electrical energy from the generator, the radiating plate causes ultrasonic vibrations in the liquid. However, the excitation components are not limited to ultrasonic transducers, and can comprise other devices or mechanisms capable of generating sufficient energy to stimulate cavitation to occur in liquid. This includes but is not limited to oscillators, (electro-mechanical) vibrators, motors, other sound-generating implements such as speakers/buzzers and the like, MEMS devices, etc. These may generally be referred to as transducers having frequency characteristics.

Although the embodiment shown herein in FIG. 1 relates, for example, to an after-market/add-on solution to a pre-installed/existing faucet, an integrated embodiment is envisioned. In such an embodiment, the excitation components may be internally integrated as part of a faucet, such as the faucet associated with tip 120 as shown in FIG. 2 (or a similar faucet, such as those comprising a detachable faucet head). For example, relative to the type of faucet shown in FIG. 2, the excitation components may be located in the portion of the faucet just prior to tip 120, so that the water coming from the source pipe/line and flowing through the faucet body is excited prior to exiting from tip 120. The driving circuit 154 may be located upstream of components 124, e.g., in another nearby/adjacent body portion of the faucet. The user can then pass the surface of the object to be cleaned under the tip so that the bubbles from the exiting water clean the surface. Alternatively, the end of the faucet, including tip 120 may, for example, be configured as a detachable head that is detachable from the overall faucet body, and that can be handheld-operated by a user so as to allow for improved (e.g., targeted) control of the water exiting from the faucet tip.

In this regard, a stand-alone faucet system that has the cleaning components and control/driving circuitry integrated therein is envisioned, e.g., so that no external handheld device 100 is needed, as the operative cleaning hardware and flow configurations (e.g., reservoir, etc) are internally integrated into the faucet. For example, instead of components 124 etc. being inside of the body 102 of the external device 100, the components 124, in addition to any (e.g., excitation) reservoir such as 138, may be internally integrated into a faucet itself.

Figure 5B:
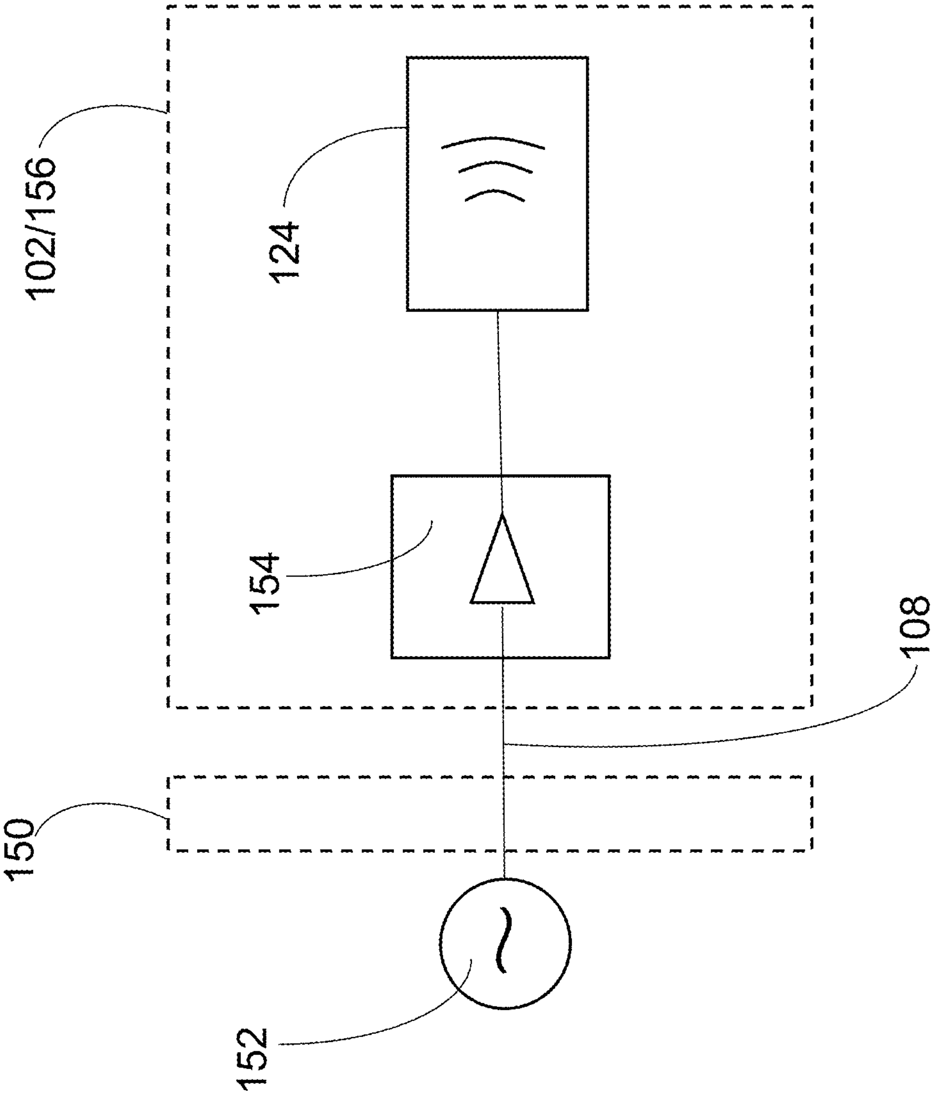
FIG. 5B illustrates an alternative schematic according to the embodiment in FIG. 1.
Figure 6:
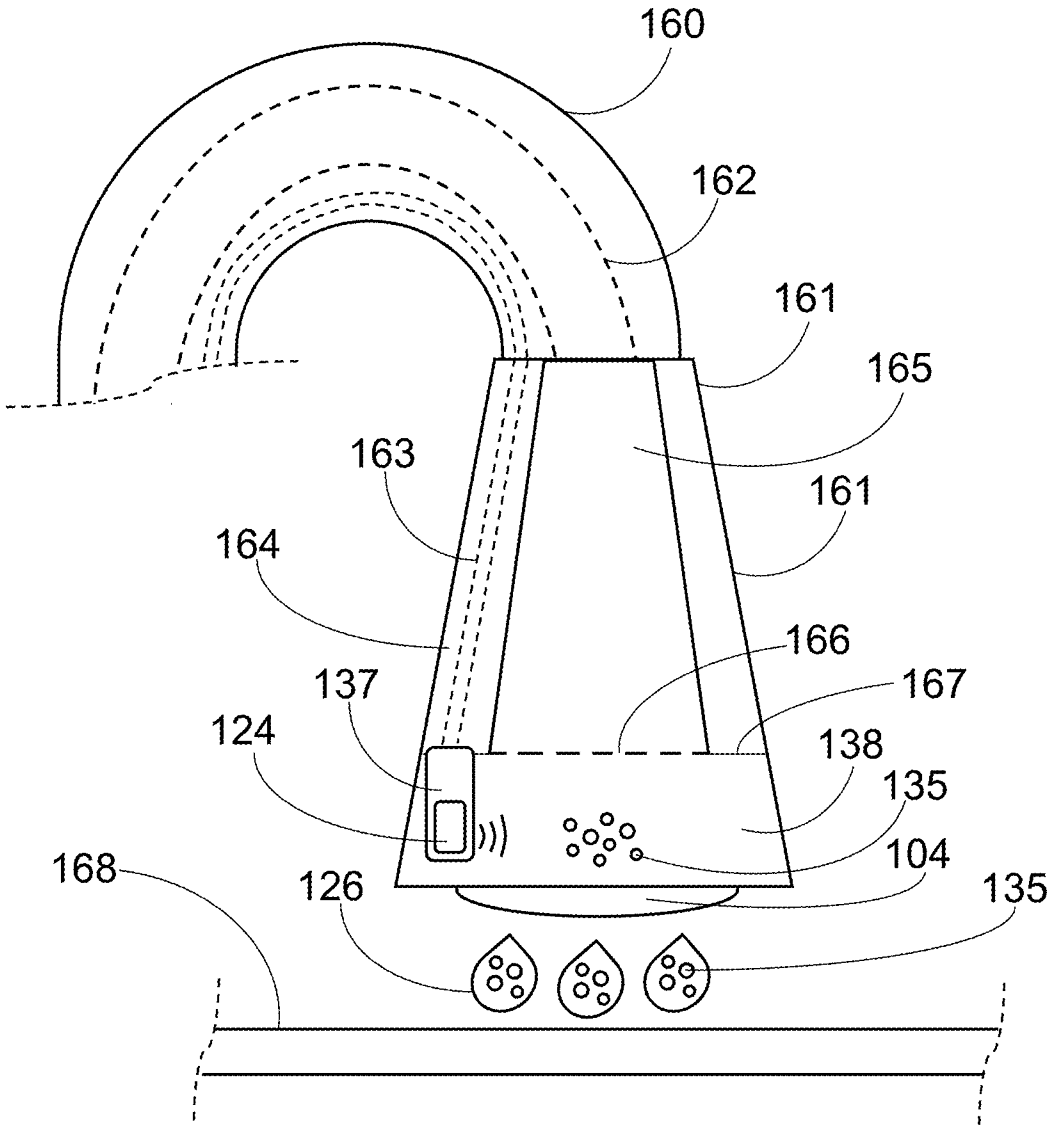
FIG. 6 illustrates an embodiment of an integrated cleaning apparatus.

FIG. 5B shows an alternative embodiment relative to FIG. 5A, wherein the embodiment of FIG. 5B may have both the components 124 and the driver circuit 154 within body 102, or both within a body portion of a faucet 156 (faucet 156 may be one such as that shown in FIG. 2 or 6). In the embodiment of FIG. 5B, the power supply 150 may be a standard adapter that converts wall AC power from source 152 to useable DC power, where the wires of cord 108 may then travel through the body 102 or a body of faucet 156 to deliver the AC (or DC) power as needed, such as to the driver circuit 154 and/or components 124. Alternatively, the adapter 150 may not be an adapter, and may just be a standard (e.g., two or three prong) plug that simply plugs into the wall and transmits the (native) wall power, wherein any power/signal (e.g., AC to DC) conversion or conditioning may take place, for example, inside the body 102 or inside of faucet 156. Accordingly, FIG. 5B represents an embodiment where the circuit 154 and components 124 may both be located within the body 102 of device 100 or may both be located within a body portion of a faucet 156, and where any AC to DC or other power/signal conversion(s) or conditioning may take place inside body 102 or within faucet 156. While FIGS. 5A and 5B depict certain arrangements of the various circuits and components, these arrangements are merely examples and are not limiting, and other arrangements are within the scope of this disclosure.

FIG. 6 illustrates an integrated embodiment as described herein, where aspects such as the wires and the excitation components are integrated into a faucet body (e.g., different from the add-on embodiment of FIG. 1). The system of FIG. 6 includes, for example, a faucet 160 comprising a detachable head 161. Head 161 may be operatively/fluidly coupled to flex-tubing 162 that runs from the water source (e.g., wall pipes underneath sink) and through the neck of the faucet, terminating at head 161. Tubing 162 may be referred to as a liquid/water conduit. Tubing 162 carries water and is sized with a length to allow for extension of the head 161 away from the faucet body 160, so that a user can grip head 161 in their hand and more easily control movement of the active end 104 over an object to be cleaned, by way of manipulating movement of head 161 (the flex-tubing may be of a certain length allowing for a certain amount of extension of head 161 from the body of faucet 160). Head 161 may have surface features/grips as described herein for improved grip. In the system of FIG. 6, at least one wire 163 (e.g., from cord 108) may also run through the interior of faucet 160 and extend into head 161 to the excitation components 124, for control/driving of the components 124. For example, a power supply such as 150 may be plugged into an outlet underneath a sink to power the cleaning electronics in the system of FIG. 6 (see for example FIGS. 5A/5B). More specifically, the wire 163 may ultimately extend to housing 137 that stores components 124, where, during operation, housing 137 is configured to at least partially be submersed in water in reservoir 138 of the head 161. The head 161 has a compartment 164 that is isolated (e.g., sealed/protected) from any water, and wire 163 runs through compartment 164 to housing 137. The water flows from tubing 162 into chamber/compartment/volume 165 of head 161. The chamber 165 has an outlet that may comprise at least one hole 166, which allows for passage of water from chamber 165 into reservoir 138. The chamber 165 may be referred to as a compartment, e.g., a first compartment. Although not shown, the chamber 165 may comprise additional water control/flow retardation elements, such as the plates 132/136 and/or tubes 134*a* . . . 134*n* as shown in FIG. 3B. For example, the chamber 165 may serve to delay or otherwise control the manner in which water enters into reservoir 138, aka controlling the rate at which reservoir 138 is filled. A wall such as wall 167 may be present to seal off compartment 164 from reservoir 138, for example. The compartment 164 may be referred to as a chamber/compartment, e.g., a second compartment/chamber. The housing 137 may interface with an opening (not shown) in wall 167 adjacent compartment 164, so that one (e.g., top) end of housing 137 resides in the dry compartment 164, and the other (e.g., bottom) end protrudes in reservoir 138, so that the energized components 124 may excite the water in reservoir 138 to create bubbles 135. Or the opening in wall 167 may be sized for wire 163, and wire 163 can pass through the opening in wall 167, and housing 137 may be completely submerged in reservoir 138. Thus, in general, the head 161 may include dedicated compartment 164, isolated from water, for the wire 163 to run through, to interface with the housing 137. The excited water 126 exiting from active end 104 of head 161 can then be used to clean a surface 168 of an object to be cleaned. Additionally, the wire 163 may have a similar length as the tubing 162, so as to accommodate the amount of extension from the body of faucet 160 as provided by tubing 162. Although shown as separate from one another in FIG. 6, the tubing 162 and wire 163 may be coupled together, e.g., up to the point where wire 163 may diverge inside head 161. For example, wire 163 may run parallel to tubing 162, and the combination of 162/163 may be coupled in a common sheathing/tubing (not shown) to run as a unitary conduit (e.g., up until the point where wire 163 diverges from tubing 162 inside of head 161). Any necessary seals/grommets/O-rings, etc. may be used to provide the desired water-tightness for any particular part (e.g., compartment, chamber, etc.) of the head 161. The reservoir 138 serves as an excitation area, and in the case of where components 124 include a transducer, the transducer may directly and/or indirectly excite the water. For example, the transducer may vibrate housing 137 so that housing 137 itself excites the water and/or the transducer itself may excite the water at the frequency of the transducer (e.g., 50 kHz). The cavitation caused by the excitation from the transducer/housing creates bubbles in the manner described herein. As such, the source water from the tubing 162 is excited in the excitation area of the head 161 such that excited water exits the active end for use in cleaning. The chamber 165 and reservoir 138 may be configured to be a common compartment for water storage. For example, there may be a common compartment comprising 138 and 165 that is separate from compartment 164, where housing 137 resides in combined compartment 138+165 to excite the liquid therein, while the circuit conduit driving the components 124 remains isolated in compartment 164. For example, the inside of head 161 may, in whole or in part, be configured similar to other embodiments described herein, such as FIGS. 3A, 3B. The disclosure therefore supports a variety of internal configurations so long as aspects such as the desired water-tightness/protection and excitation is/are realized.

Figure 7:
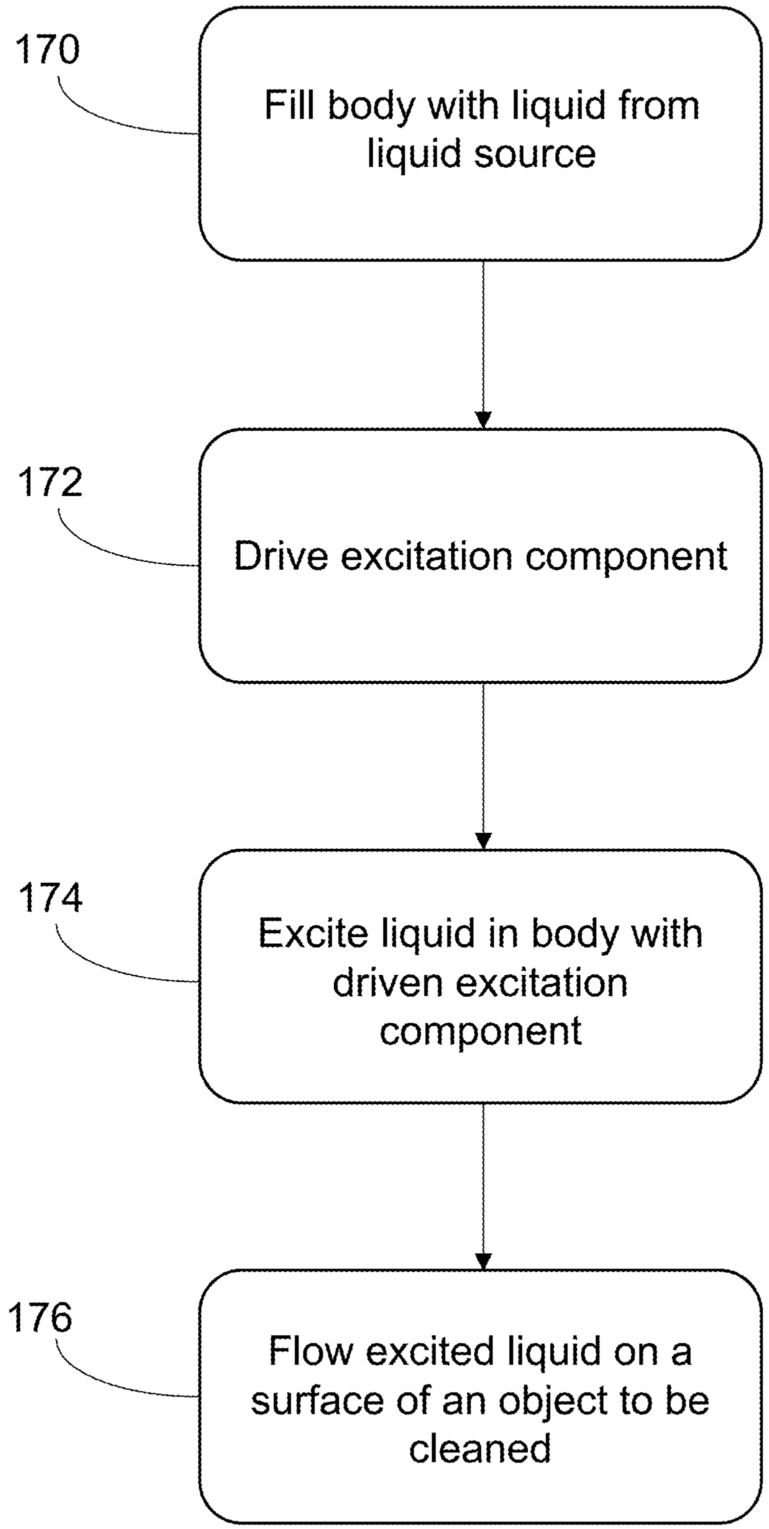
FIG. 7 illustrates a method of cleaning according to the various embodiments.

FIG. 7 illustrates a process for a method of cleaning according to the embodiments described herein. At step 170, the body 102 (or head 161) is filled with liquid (e.g., water) from the water source, such as a faucet. At step 172, the cleaning electronics (124) are powered/activated by way of the power supply and circuits (e.g., 150, 154, etc.), so that the excitation component is driven to, for example, vibrate according to its rated characteristics. In some embodiments this may be a 50 kHz-rated transducer generating corresponding (ultrasonic) vibrations. At step 174, the vibrations transfer to the liquid (water) contained in the internal volume/reservoir (e.g., 138), and cause cavitation to occur. The corresponding voids that are formed manifest as bubbles (135), and these bubbles may be used for cleaning purposes. At step 176, the excited water (126) that exits from the outlet of the body/head is directed to flow on a surface of an object to be cleaned, such as a dinner plate, etc., so that the micro-bubbles (135) burst on the object surface (e.g., 168), creating millions of micro-jets that blast away surface particles, thereby cleaning the surface without the need for conventional soap products used in combination with the water.

While the preferred embodiment relies only on water as a cleaning solution (e.g., so as to realize the above-mentioned environmental and reduced waste benefits), other embodiments may use solutions other than just water alone, such as water-based or solvent-based solutions. These other solutions may include wetting agents (e.g., surfactants) that function to reduce surface tension and increase cavitation. Such additional solutions could be mixed in with the water in the reservoir in the above-described embodiments. For example, there may be an additional chamber/reservoir for such cleaning solutions, such chambers being in an operative fluid communication relationship with overall water reservoir, to allow for mixing of the solution with the water. Or alternatively there may be no mixing, and a reservoir of just solution may be excited in the manners described herein.

Other variations of various features of the device/system are also envisioned. For example, the device may be configured as a smart device, such that powering on/off of the cleaning option may accomplished remotely via a mobile phone or such as via a voice assistant service. In such an embodiment, the device 100 or related parts (e.g., power supply) may comprise the necessary network hardware/software to be able to communicate via Wi-Fi, Bluetooth, or other wireless protocol capable of providing the desired wireless operation and/or interconnectivity.

Additionally, the button 110 can be configured as a simple manual push button actuated by pressing, or as a touch/motion sensitive "button". The touch sensitive button may be actuated by touching of the button (e.g., using capacitive touch). The "button" and/or the on/off state may also, or in the alternative, be configured to be actuated via motion sensitive controls that detect waiving of a user's body part (e.g., hand/finger(s)) over the button 110 and/or other sensing part of the faucet. In this regard, the button 110 itself and/or an associated detection sensor may be configured to sense movement and actuate the on/off state of the cleaning effect based on such detection. In any of these button embodiments, the on/off state may not only comprise on and off functions, but also various cleaning strength settings, such as high, medium, or low. The use of various strength settings may require a plurality of transducers in the body of the device. For example, the high setting may be associated with a 30 kHz transducer, the medium setting may be associated with a 50 kHz transducer, and the low setting may be associated with a 100 kHz transducer (e.g., since lower frequencies tend to produce stronger bubbles). These transducer ratings and associated power label settings are merely examples, and are not limiting. For example, the cleaning settings could instead be labelled as "fine" and "coarse", with the "fine" setting be associated with a 200 kHz transducer indicating it is intended to be used for cleaning of delicate items and the "coarse" setting being associated with a 50 kHz transducer indicating intended use for cleaning of less delicate items. The housing 137 may be sized to accommodate more than one transducer, or multiple housings, each comprising its own separate transducer, may be present. In addition, although not shown, the interior volume of body 102 can be arranged in a staged configuration, for example with multiple reservoirs. One reservoir may be configured to be excited by a transducer of a first power/frequency rating, and a second, e.g., downstream, reservoir may be configured to be associated with a second transducer of a second power/frequency rating different than the first. Thus, embodiments where the internal volume of the body is configured to have several cleaning stages are envisioned and covered by the techniques described herein. Alternatively, there may be a single reservoir comprising plural transducers, wherein the water in this common reservoir can be excited by differently rated transducers.

Further regarding the button 110, the button may comprise a single button or a plurality of buttons (e.g., one button for on/off functions, another button for low/medium/high setting functions). In connection with the various power/setting modes described herein, actuating the low/medium/high settings may cause the power being delivered by way of actuating button 110 to be distributed/routed via the settings button to the transducer corresponding to the current setting (e.g., with the power button set in an "on" state, and the low/medium/high button set to low, the power is directed to the transducer associated with the low setting, but a change to the high setting would remove the power from the low transducer to the high transducer).

The shape/size of the device 100 as shown in the figures is only one example and is not limiting. Additional embodiments of the device 100 may include where flex-tubing is used so that the handheld unit can be separated/extended from the faucet, to allow for increased maneuvering when using the handheld unit. For example, the device 100 can be included as part of a kit a flex-tubing adapter or other flex-tubing connection that allows for disconnection of the body 102 from the faucet, with freedom of range of the body being defined by the length of the flex-tubing. Thus, the cleaning device herein, can, at the consumer level, be provided in a variety of configurations, including a stand-alone after-market attachment/add-on as shown, for example, in FIG. 1, or the cleaning elements/components including the driver/control circuit and excitation elements can be integrated into a standalone faucet to provide a system where the faucet contains the implements/components for cleaning therein, such as shown in FIG. 6. For example, in the integrated/system embodiment of FIG. 6, the electronics, corresponding power adapter, etc. may be configured in a similar manner as faucets that have integrated motion-controlled on/off of water flow (e.g., automated faucets that operate based on the detection of the presence of hands under the faucet). The cleaning device of FIG. 1 may be sold as a kit along with a faucet.

While the primary embodiment is envisioned for the cleaning of object that is passed under the faucet in which the cleaning device is installed, use of such cleaning device is not that limited. For example, similar excitation components could be utilized in other installations such as a shower head, garden hose (e.g., garden hose handle), washing machines, etc. The term “faucet” as used herein may therefore refer to a kitchen/bathroom sink faucet, a shower head, an end of a hose or a spigot that feeds a hose, the portion of a washing machine that feeds water into the washing machine basin, and so on and so forth. The excited water in each case will provide some degree of cleaning effect, and therefore the techniques described herein have broad applicability for any liquid-based systems where cleaning may be beneficial or desired.

In the present disclosure, all or part of the units or devices of any system and/or apparatus, and/or all or part of functional blocks in any block diagrams and flow charts may be executed by one or more electronic circuitries including a semiconductor device, a semiconductor integrated circuit (IC) (e.g., such as a processor, CPU, etc.), or a large-scale integration (LSI). The LSI or IC may be integrated into one chip and may be constituted through combination of two or more chips. For example, the functional blocks other than a storage element may be integrated into one chip. The integrated circuitry that is called LSI or IC in the present disclosure is also called differently depending on the degree of integrations, and may be called a system LSI, VLSI (very large-scale integration), or ULSI (ultra large-scale integration). For an identical purpose, it is possible to use an FPGA (field programmable gate array) that is programmed after manufacture of the LSI, or a reconfigurable logic device that allows for reconfiguration of connections inside the LSI or setup of circuitry blocks inside the LSI. Furthermore, part or all of the functions or operations of units, devices or parts or all of devices can be executed by software processing (e.g., coding, algorithms, etc.). In this case, the software is recorded in a non-transitory computer-readable recording medium, such as one or more ROMs, RAMs, optical disks, hard disk drives, solid-state memory, servers, cloud storage, and so on and so forth, having stored thereon executable instructions which can be executed to carry out the desired processing functions and/or circuit operations. For example, when the software is executed by a processor, the software causes the processor and/or a peripheral device to execute a specific function within the software. The system/method/device of the present disclosure may include (i) one or more non-transitory computer-readable recording mediums that store the software, (ii) one or more processors (e.g., for executing the software or for providing other functionality), and (iii) a necessary hardware device (e.g., a hardware interface). Additionally, any recitation herein of receiver/transmitter may be construed as transceiver, such that any unit with a receiver/transmitter is capable of transceiving. Software and/or programming may be configured to achieve the desired operational characteristics.

The embodiments were chosen and described in order to best explain the principles of the disclosure and its practical application to thereby enable others skilled in the art to best utilize the disclosure in various embodiments and with various modifications as are suited to the particular use contemplated. Aspects of the disclosed embodiments may be mixed to arrive at further embodiments within the scope of the invention. Use of terms such as “first” and “second” is not limiting in terms of designations of elements.

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A cleaning apparatus for use with a liquid source, the cleaning apparatus comprising:

a control circuit;

a body configured to hold liquid, the body comprising:

a first end, the first end of the body comprising an attachment coupling configured to operatively attach to a body portion of the liquid source;

a second end, the second end of the body being opposite the first end and comprising an outlet;

at least one wall defining an internal volume of the body, the at least one wall extending between the first end of the body and the second end of the body;

a reservoir within the internal volume of the body, the reservoir being between the first end of the body and the second end of the body and configured to store liquid; and at least one excitation component within the internal volume and in an operative relationship with the reservoir, the at least one excitation component configured to be controlled by the control circuit and, when controlled by the control circuit, configured to generate energy sufficient to induce the formation of voids in the liquid in the reservoir, the voids being trapped in the liquid in the reservoir, wherein the outlet of the second end of the body is configured to output liquid containing the trapped voids.

2. The cleaning apparatus according to claim 1, further comprising at least one housing, at least a portion of the at least one housing being within the reservoir, wherein the at least one excitation component is within the at least one housing.

3. The cleaning apparatus according to claim 2, wherein the at least one housing is configured to be completely submerged in the liquid in the reservoir.

4. The cleaning apparatus according to claim 1, wherein the reservoir is closer to the second end of the body than the first end of the body.

5. The cleaning apparatus of claim 4, further comprising at least one liquid distribution arrangement contained within the internal volume of the body.

6. The cleaning apparatus according to claim 5, wherein the at least one liquid distribution arrangement comprises at least one liquid distribution plate.

7. The cleaning apparatus according to claim 6, wherein the at least one liquid distribution plate is upstream of the reservoir and in operative fluid communication with the reservoir.

8. The cleaning apparatus according to claim 1, wherein the formation of voids in the liquid in the reservoir is caused by cavitation induced by the energy generated from the at least one excitation component, and the trapped voids comprise bubbles.

9. The cleaning apparatus of claim 1, wherein the at least one excitation component comprises at least one transducer with a frequency characteristic within the range of 20 kHz to 200 kHz.

10. The cleaning apparatus of claim 9, wherein the at least one transducer is at least one ultrasonic transducer configured to generate sound waves at a frequency of 50 KHz.

11. The cleaning apparatus according to claim 1, further comprising an inlet at the first end of the body, wherein the liquid source is a water faucet, the body portion is an end of the water faucet, and the liquid is water, and the attachment coupling is configured to operatively attach to the end of the water faucet to enable water from the water faucet to flow into the body via the inlet.

12. A cleaning system comprising a liquid source body and a cleaning device formed integral with the liquid source body, the cleaning system comprising:

a liquid conduit, the liquid conduit configured to provide liquid from a liquid source through the liquid source body for use in the cleaning system;

a control circuit, the control circuit configured to provide control signals for use in the cleaning device of the cleaning system;

a signal-carrying conduit, the signal-carrying conduit configured to carry the control signals from the control circuit and extend through a portion of the liquid source body;

at least one excitation component, the at least one excitation component configured to be controlled by the control signals of the control circuit; and a head portion configured to store and excite liquid flowing from the liquid conduit into the head portion, the head portion comprising:

a first compartment configured to allow for entry and storage of incoming liquid from the liquid conduit into the head portion;

a second compartment configured to allow for entry and storage of the signal-carrying conduit into the head portion, the second compartment of the head portion being isolated from the first compartment of the head portion; and an outlet configured to output liquid from the first compartment;

wherein the at least one excitation component is operatively connected to the signal-carrying conduit and, when controlled by the control signals of the control circuit, is configured to generate energy sufficient to induce the formation of voids in the liquid in the first compartment, the voids being trapped in the liquid, and wherein the outlet is configured to output liquid containing the trapped voids.

13. The cleaning system according to claim 12, wherein the at least one excitation component, when controlled by the control signals of the control circuit, generates mechanical vibrations capable of being transferred to the liquid in the first compartment to cause excitation of the liquid in the first compartment, the excitation of the liquid being based on vibration characteristics of the mechanical vibrations generated by the excitation component.

14. The cleaning system according to claim 13, wherein the at least one excitation component comprises at least one ultrasonic transducer, and the at least one ultrasonic transducer is housed in a housing that at least partially protrudes into the first compartment.

15. The cleaning system according to claim 12, wherein the first compartment comprises a first chamber and a reservoir, the liquid is water, and the reservoir is in operative fluid communication with the first compartment and configured to receive water output from the first chamber.

16. The cleaning system according to claim 12, wherein the liquid source body is a body of a water faucet and the liquid is water, and the second compartment is isolated from the first compartment in a water-tight configuration to prevent the signal-carrying conduit from being directly exposed to any water in the head portion.

17. The cleaning system according to claim 16, wherein the control circuit is in a circuit housing outside of and separate from the water faucet body, the at least one excitation component is in a component housing that at least partially protrudes into the second compartment, and the signal-carrying conduit extends from the circuit housing, runs through a portion of the water faucet body and into the second compartment, and operatively attaches to the component housing inside the second compartment.

18. A method for cleaning an object with a cleaning device and a liquid source, the method comprising:

filling a reservoir within a body of the cleaning device with liquid from the liquid source through a first end of the body of the cleaning device;

exciting the liquid in the reservoir of the body of the cleaning device with at least one excitation component within the body of the cleaning device, the at least one excitation component being controlled by control signals from a control circuit associated with the cleaning device; and flowing the excited liquid, which is output from an outlet on a second end of the cleaning device, on a surface of an object, such that surface contaminants on the surface of the object are removed by way of a surface interaction between the excited liquid and the object.

19. The cleaning apparatus according to claim 1, wherein the body further comprises a gripping feature on the outer surface of the body.

20. The cleaning apparatus according to claim 19, wherein the gripping feature includes a plurality of contours to accommodate a user's grip.

* * * * *